(12) United States Patent
Park et al.

(10) Patent No.: US 10,123,216 B2
(45) Date of Patent: Nov. 6, 2018

(54) APPARATUS AND METHOD FOR CONTROLLING INTER-CLUSTER INTERFERENCE IN A MULTI CELL NETWORK

(71) Applicant: Samsung Electronics Co. Ltd., Suwon-si, Gyeonggi-do (KR)

(72) Inventors: Hye-Mi Park, Yongin-si (KR); Joseph Jeon, Seongnam-si (KR); June Moon, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 13/893,728

(22) Filed: May 14, 2013

(65) Prior Publication Data

US 2013/0310054 A1 Nov. 21, 2013

(30) Foreign Application Priority Data

May 15, 2012 (KR) ........................ 10-2012-0051353

(51) Int. Cl.
*H04L 12/26* (2006.01)
*H04W 16/24* (2009.01)
*H04W 24/02* (2009.01)

(52) U.S. Cl.
CPC ............ *H04W 16/24* (2013.01); *H04W 24/02* (2013.01)

(58) Field of Classification Search
CPC ..... H04W 24/02; H04W 16/10; H04W 28/06; H04W 48/18; H04W 92/20; H04W 16/24; H04W 16/32; H04W 24/08; H04W 48/20; H04W 72/121; G01S 5/0252; G01S 5/021; G01S 5/0257; G01S 5/02; G01S 5/14
USPC ........... 455/446, 404.2, 456.1, 500; 709/224, 709/226, 54; 370/252
See application file for complete search history.

(56) References Cited

U.S. PATENT DOCUMENTS

| | | | |
|---|---|---|---|
| 8,229,443 B2 | 7/2012 | Caire et al. | |
| 2008/0188236 A1* | 8/2008 | Alles | G01S 5/021 455/456.1 |
| 2008/0280635 A1* | 11/2008 | Lei | H04W 8/005 455/513 |
| 2010/0042716 A1* | 2/2010 | Farajidana | H04W 16/10 709/224 |
| 2011/0039517 A1* | 2/2011 | Wigren | H04W 64/00 455/404.2 |
| 2013/0196699 A1* | 8/2013 | Davydov | H04L 5/1469 455/500 |

* cited by examiner

*Primary Examiner* — Natasha W Cosme
(74) *Attorney, Agent, or Firm* — Jefferson IP Law, LLP (57) ABSTRACT

An apparatus and method for controlling an inter-cluster interference in a multi cell network are provided. The method includes collecting cluster information in order to cluster base stations into at least one cluster; clustering the base stations into at least one cluster by using at least one of a dynamic clustering method and a hierarchical clustering method, based on the cluster information, determining a cluster boundary base station, which satisfies a predetermined condition, among base stations in a cluster, and controlling the inter-cluster interference.

11 Claims, 6 Drawing Sheets

FIG.8

APPARATUS AND METHOD FOR CONTROLLING INTER-CLUSTER INTERFERENCE IN A MULTI CELL NETWORK

PRIORITY

This application claims the priority under 35 U.S.C. § 119(a) of a Korean patent application filed on May 15, 2012 in the Korean Intellectual Property Office and assigned Serial No. 10-2012-0051353, the entire disclosure of which is hereby incorporated by reference.

BACKGROUND OF THE INVENTION

1. Field of the Invention

The present invention relates to a multi cell wireless network. More particularly, the present invention relates to an apparatus and method for controlling an inter-cluster interference in a multi cell network.

2. Description of the Related Art

In an interference control technique according to the related art in a multi cell network, interference between base stations has been controlled such that a plurality of base stations are clustered into several clusters and electric power coordination between the base stations in each cluster is performed. When the interference control technique according to the related art is used, interference between the base stations in a corresponding cluster can be effectively controlled because the plural base stations are clustered. However, because a base station on a boundary of a cluster is adjacent to a base station of other clusters, and the base stations on the boundary of each cluster are not mutually controlled, interference among the base stations on the boundary of each cluster cannot be effectively controlled.

Accordingly, there is a problem in that the base-station clustering method according to the related art fails to solve interference among the base stations. If the number of base stations to be clustered is increased in order to solve such a problem, a large amount of control information is generated thereby increasingly burdening a control server. Moreover, a capacity limit of the control server restricts the number of base stations which can be clustered. Therefore, continually increasing the number of base stations rendered impossible by the inherent capacity limitations of the control server.

Therefore, a need exists for an apparatus and method for controlling inter-cluster interference in a multi cell network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling inter-cluster interference in a multi cell network.

Another aspect of the present invention is to provide an apparatus and method for minimizing inter-cluster interference by clustering base stations into several clusters in a multi cell network.

In accordance with an aspect of the present invention, a method of controlling an inter-cluster interference in a multi cell network is provided. The method includes collecting cluster information in order to cluster base stations into at least one cluster, clustering the base stations into at least one cluster by using at least one of a dynamic clustering method and a hierarchical clustering method, based on the cluster information, determining a cluster boundary base station, which satisfies a predetermined condition, among base stations in a cluster, and controlling the inter-cluster interference.

In accordance with another aspect of the present invention, an apparatus for controlling inter-cluster interference in a multi cell network is provided. The apparatus includes a base station information registering server that stores clustering information for clustering base stations into at least one cluster, and a controller that clusters the base stations into at least one cluster by using at least one of a dynamic clustering method and a hierarchical clustering method based on the clustering information, and determines a cluster boundary base station, which satisfies a predetermined condition, among base stations included in one cluster so as to control the inter-cluster interference.

According to aspects of the present invention, inter-cluster interference may be minimized using at least one of a dynamic clustering method and a hierarchical clustering method.

On the other hand, various effects as well as the above-mentioned effect can be directly or suggestively disclosed in the detailed description of embodiments of the present invention as follows.

BRIEF DESCRIPTION OF THE DRAWINGS

The above and other aspects, features, and advantages of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Exemplary embodiments of the present invention decrease the number of base stations on a boundary of clusters without increasing the number of base stations to be clustered such that inter-cluster interference can be effectively controlled.

Exemplary embodiments of the present invention include a dynamic clustering method according to a first exemplary embodiment, and a hierarchical clustering method according to a second exemplary embodiment, in order to minimize inter-cluster interference. The dynamic clustering method according to the first exemplary embodiment of the present invention corresponds to a method for changing a dynamic cluster allocation so that a certain base station is prevented from being continuously selected as a cluster-boundary base station, and the hierarchical clustering method according to the second exemplary embodiment of the present invention corresponds to a method for controlling interference among cluster-boundary base stations by sharing scheduling information of the cluster-boundary base stations which are determined as cluster-boundaries among the clusters by using an upper layer cluster management server for managing all clusters. The cluster-boundary base stations satisfy a condition of determining a boundary station. The first exemplary embodiment of the present invention and the second exemplary embodiment of the present invention may be used separately or in a combination.

An apparatus and method for clustering base stations in a multi cell network according to exemplary embodiments of the present invention will be described in detail.

According to a first exemplary embodiment of the present invention, the dynamic clustering method corresponds to a method for changing a dynamic cluster allocation so that a certain base station is prevented from being continuously selected as a cluster-boundary base station, in which a group pattern is changed by a period of n time slots.

Figure 1:
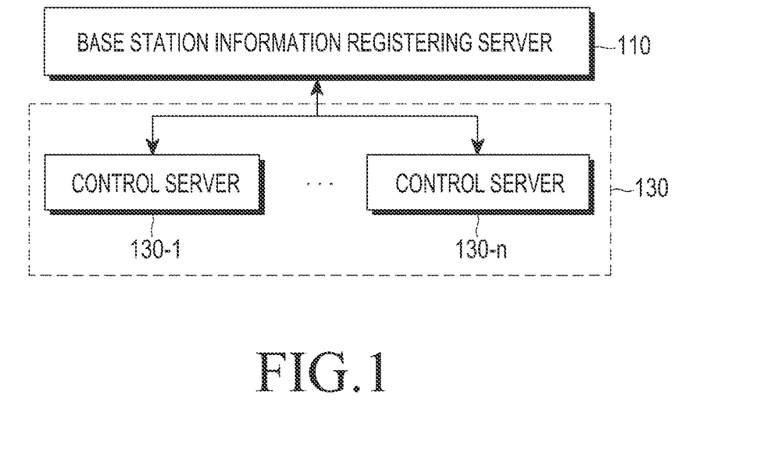
FIG. 1 is a view illustrating an apparatus for controlling inter-cluster interference using a dynamic clustering method according to a first exemplary embodiment of the present invention.

FIG. 1 is a view illustrating an apparatus for controlling inter-cluster interference using a dynamic clustering method according to the first exemplary embodiment of the present invention.

Referring to FIG. 1, an interference controlling apparatus according to the first exemplary embodiment of the present invention includes a server 110 (e.g., a base station information registering server) for registering information on base stations, and at least one of control servers 130-1, 130-2, . . . , and 130-n. The control servers 130-1, 130-2, . . . , and 130-n may be included in a base station controller 130. Alternatively, the control servers 130-1, 130-2, . . . , and 130-n may otherwise be associated with and operatively connected to the base station controller 130.

The information registering server 110 stores information for clustering plural base stations into at least one cluster, and transmits the clustering information to at least one of the control servers 130-1, 130-2, . . . , and 130-n in a corresponding time slot. The clustering information is transmitted from at least one of the control servers 130-1, 130-2, . . . , and 130-n.

The number of control servers 130-1, 130-2, . . . , and 130-n corresponds to the number of clusters, and each of the control servers 130-1, 130-2, . . . , and 130-n collects the clustering information from the information registering server 110. Each of the control servers 130-1, 130-2, . . . , and 130-n determines clustering information for clustering a plurality of base stations in a next time slot, and transmits the clustering information to the information registering server 110.

A method that each of the control servers 130-1, 130-2, . . . , and 130-n uses for determining clustering information to be used in a next time slot will be described below with reference to FIG. 6.

According to a second exemplary embodiment of the present invention, the hierarchical clustering method includes an upper layer cluster concept for a management of clusters, in order to effectively control interference among base stations on boundaries of clusters.

Figure 2:
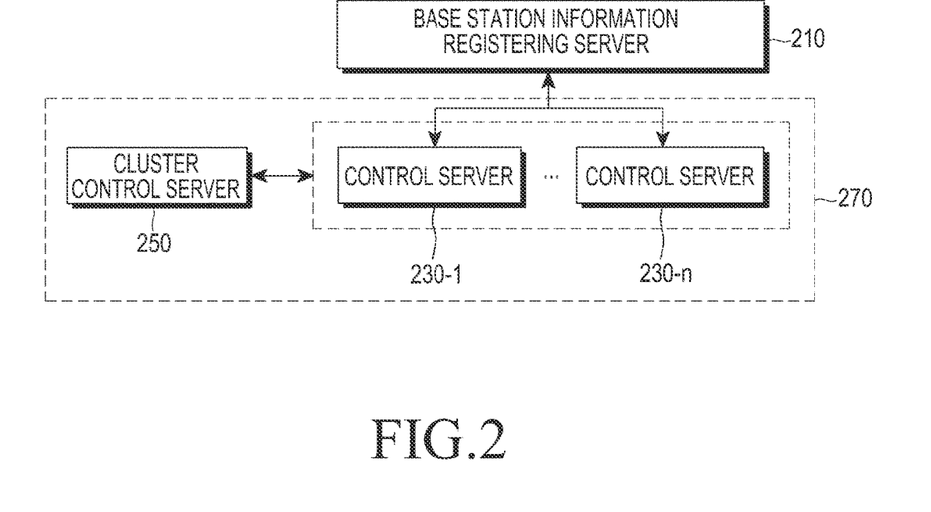
FIG. 2 is a view illustrating an apparatus for controlling inter-cluster interference using a hierarchical clustering method according to a second exemplary embodiment of the present invention.

FIG. 2 is a view illustrating an apparatus for controlling inter-cluster interference using a hierarchical clustering method according to the second exemplary embodiment of the present invention.

Referring to FIG. 2, an interference control apparatus according to the second exemplary embodiment of the present invention includes a server 210 (e.g., a base station information registering server) for registering information on the base stations, at least one control server 230-1, 230-2, ..., and 230-n, and a cluster control server 250. The control servers 230-1, 230-2, ..., and 230-n and the cluster control server 250 may be included in a base station controller 270. Alternatively, the control servers 230-1, 230-2, ..., and 230-n may otherwise be associated with and operatively connected to the base station controller 270.

The information registering server 210 stores information for clustering a plurality of base stations into at least one cluster, and transmits the clustering information to at least one of the control servers 230-1, 230-2, ..., and 230-n. The clustering information is transmitted from at least one of the control servers 230-1, 230-2, ..., and 230-n.

The number of control servers 230-1, 230-2, ..., and 230-n corresponds to the number of clusters, and each of the control servers 230-1, 230-2, ..., and 230-n collects the clustering information from the information registering server 210. Each of the control servers 230-1, 230-2, ..., and 230-n selects a boundary base station and an interference base station among the plurality of base stations included in a cluster. Each of the control servers 230-1, 230-2, ..., and 230-n performs a sub-scheduling for each base station and carries out a mutual electric power coordination. The boundary base station stores information on a terminal which determines the boundary base station itself.

The cluster control server 250 corresponds to a server for controlling the boundary base stations. When a terminal, which determines itself as the boundary base station, is allocated to the boundary base station, the cluster control server 250 performs electric power coordination so as not to allocate a terminal for which an interference base station performs a scheduling.

An operation of each of the control servers 230-1, 230-2, ..., and 230-n and an operation of the cluster control server 250 will be described later with reference to FIG. 8.

Hereinafter, a process of determining a boundary base station, which is performed according to the first and second exemplary embodiments of the present invention, will be described with reference to FIGS. 3 and 4. Thereafter, a method of controlling inter-cluster interference using a dynamic clustering method and a hierarchical clustering method according to the first and second embodiments of the present invention will be described in detail with reference to FIGS. 5 to 8.

Figure 3:
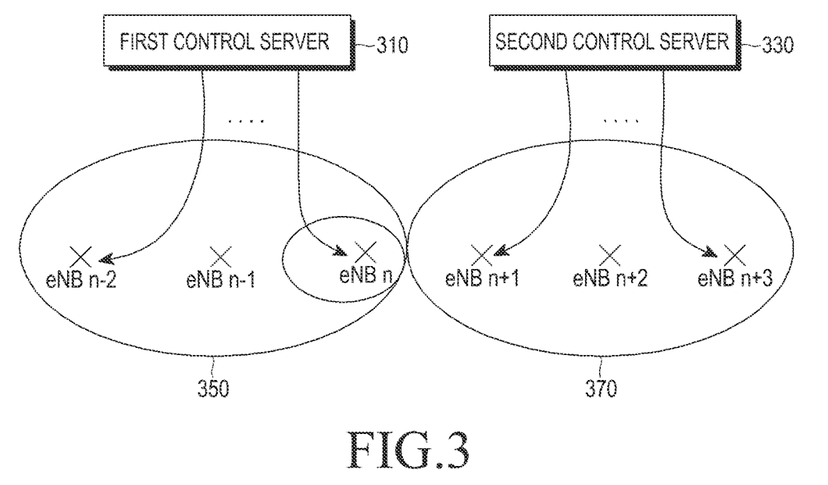
FIG. 3 is a view illustrating an example of determining base stations on a boundary of each cluster, which can be performed in methods according to exemplary embodiments of the present invention.

FIG. 3 is a view illustrating an example of determining base stations on a boundary of each cluster, which can be performed in methods according to exemplary embodiments of the present invention.

Referring to FIG. 3, although a case in which two clusters exist is shown as an example, according to exemplary embodiments of the present invention, two or more clusters may exist. First control server 310 and second control server 330 respectively control a first cluster 350 and second cluster 370. For example, the first control server 310 and second control server 330 receive Received Signal Strength Indication (RSSI) information from terminals which are respectively connected to each of corresponding clusters and receive a service, and determine a boundary base station of each cluster by using the RSSI information.

According to exemplary embodiments of the present invention, the first control server 310 receives RSSI information in relation to eNBn−2 to eNBn+3 from a terminal which uses a base station n (hereinafter, a base station and an eNB are interchangeably used), which exists in the first cluster 350, as a serving eNB. The first control server 310 distinguishes the eNB included in its cluster (e.g., the first cluster 350) from an eNB included in another cluster (e.g., the second cluster 370), and searches base stations which satisfy a conditional expression for a determination of cluster boundary base stations in Equation 1 by using the RSSI information of the serving eNB and RSSI information of eNB included in the cluster 370.

$$\frac{RSSI_i}{RSSI_{serving}} > \alpha \qquad \text{Equation 1}$$

In Equation 1, $RSSI_i$ is RSSI information of the eNB included in the second cluster 370, $RSSI_{serving}$ is serving information of the serving eNB included in the first cluster 350, and $\alpha$ is an experimental value, which is a critical value used for determining cluster boundary base stations.

At this time, the first control server 310 determines whether the serving base station corresponds to a cluster boundary base station for each terminal, by using Equation 1.

Hereinafter, a process of determining the above-mentioned cluster boundary base station will be described in detail with reference to FIG. 4.

Figure 4:
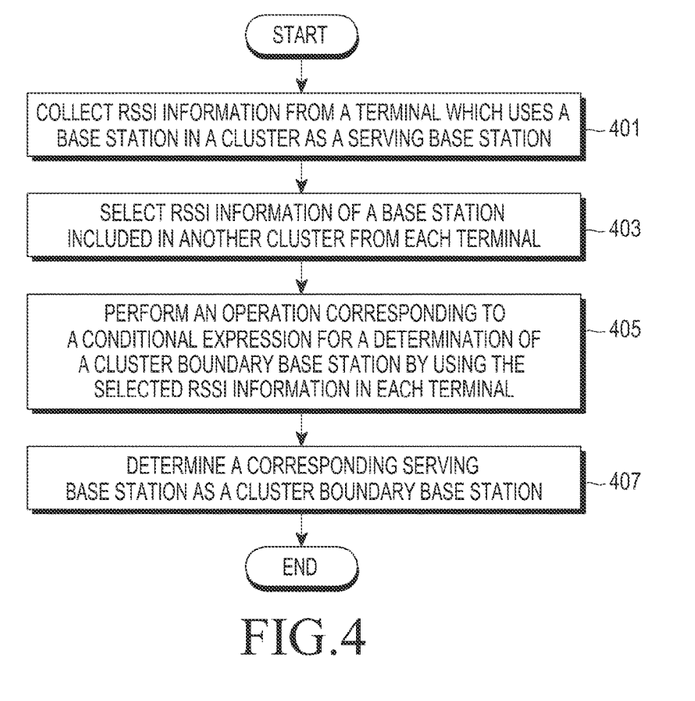
FIG. 4 is a flowchart illustrating a process of determining base stations on a boundary of each cluster, which can be performed in methods according to exemplary embodiments of the present invention.

FIG. 4 is a flowchart illustrating a process of determining base stations on a boundary of each cluster, which can be performed in methods according to exemplary embodiments of the present invention.

Referring to FIG. 4, in step 401, the first control server 310 receives RSSI information of all base stations from a terminal which uses a base station included in the first cluster 350 as a serving base station.

Thereafter, in step 403, the first control server 310 selects the RSSI information included in the second cluster 370, for each terminal.

In step 405, the first control server 310 performs an operation corresponding to Equation 1 for determining a cluster boundary base station by using the RSSI information of the serving base station and the RSSI information of the base station included in the second selected cluster 370, for each terminal.

In step 407, the first control server 310 determines that the corresponding serving base station corresponds to a cluster boundary base station, if a terminal satisfying Equation 1 exists.

Hereinafter, the dynamic clustering method and the hierarchical clustering method according to the first and second exemplary embodiments of the present invention which include the process of determining the cluster boundary base station will be described.

Figure 5:
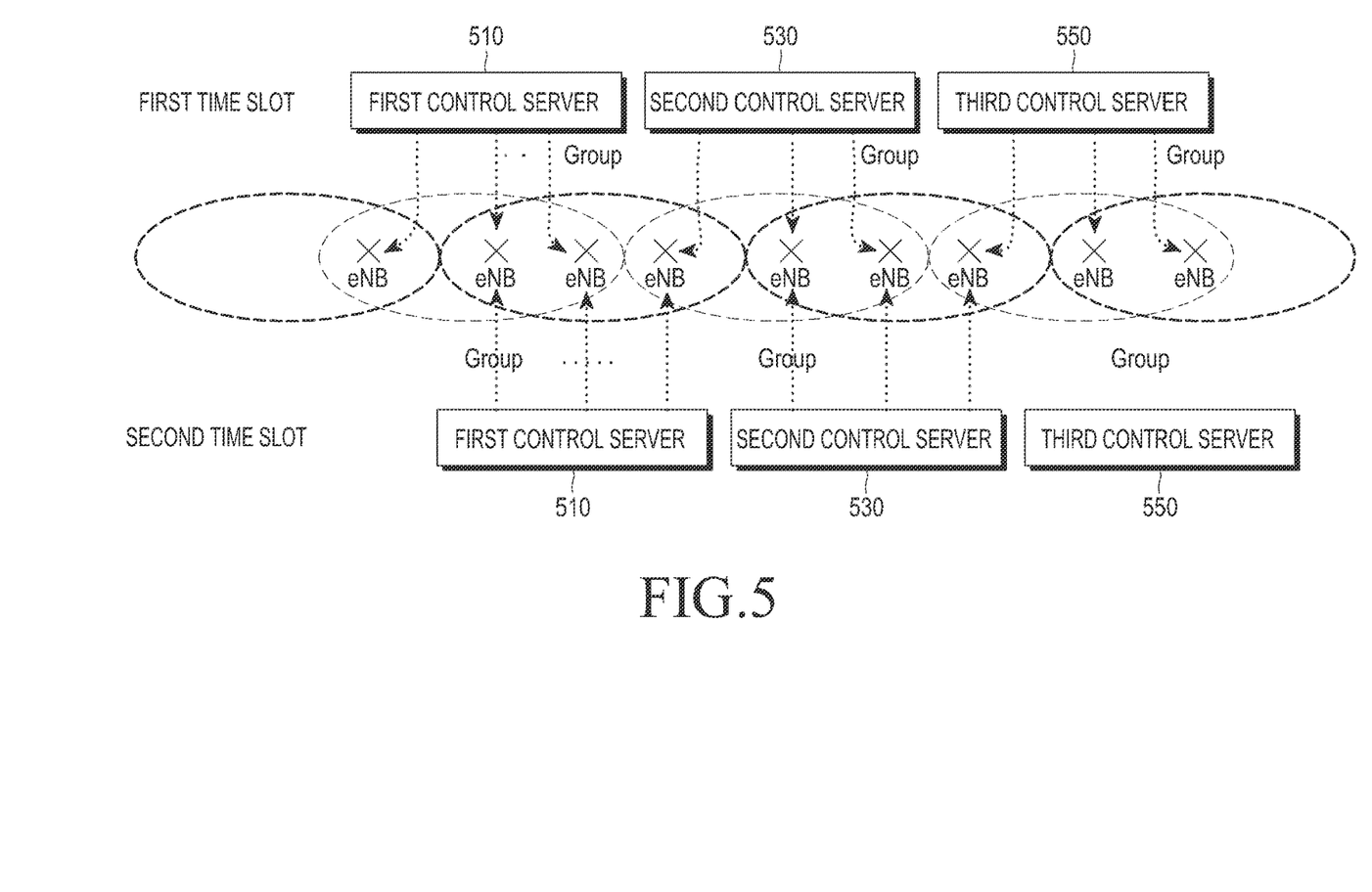
FIG. 5 is a view illustrating an example of controlling inter-cluster interference using a dynamic clustering method according to the first exemplary embodiment of the present invention.

FIG. 5 is a view illustrating an example of controlling inter-cluster interference using a dynamic clustering method according to the first exemplary embodiment of the present invention.

Referring to FIG. 5, the dynamic clustering method corresponds to a method for changing a dynamic cluster allocation in order to prevent a certain base station from continuously becoming a cluster boundary base station. For example, the dynamic clustering method is to change a base station combination (hereinafter, referred to as "group pattern") included in a cluster in a period of n time slots. In FIG. 5, as an example, a group pattern, which is included in at least one of a first control server 510, a second control server 530, and a third control server 550, is changed in at least one of a first time slot and a second time slot according to the dynamic clustering method.

The group pattern is determined so that all base stations satisfy Equation 2.

$$\frac{N_{i,edge}}{N_{group\ pattern}} < \beta \quad \text{Equation 2}$$

In Equation 2, $N_{group\ pattern}$ is the number of group patterns, $N_{i,edge}$ is the number of group patterns, in which base station i is determined as a cluster boundary base station, and β is an experimental value indicating a ratio of cluster boundary base station patterns.

Figure 6:
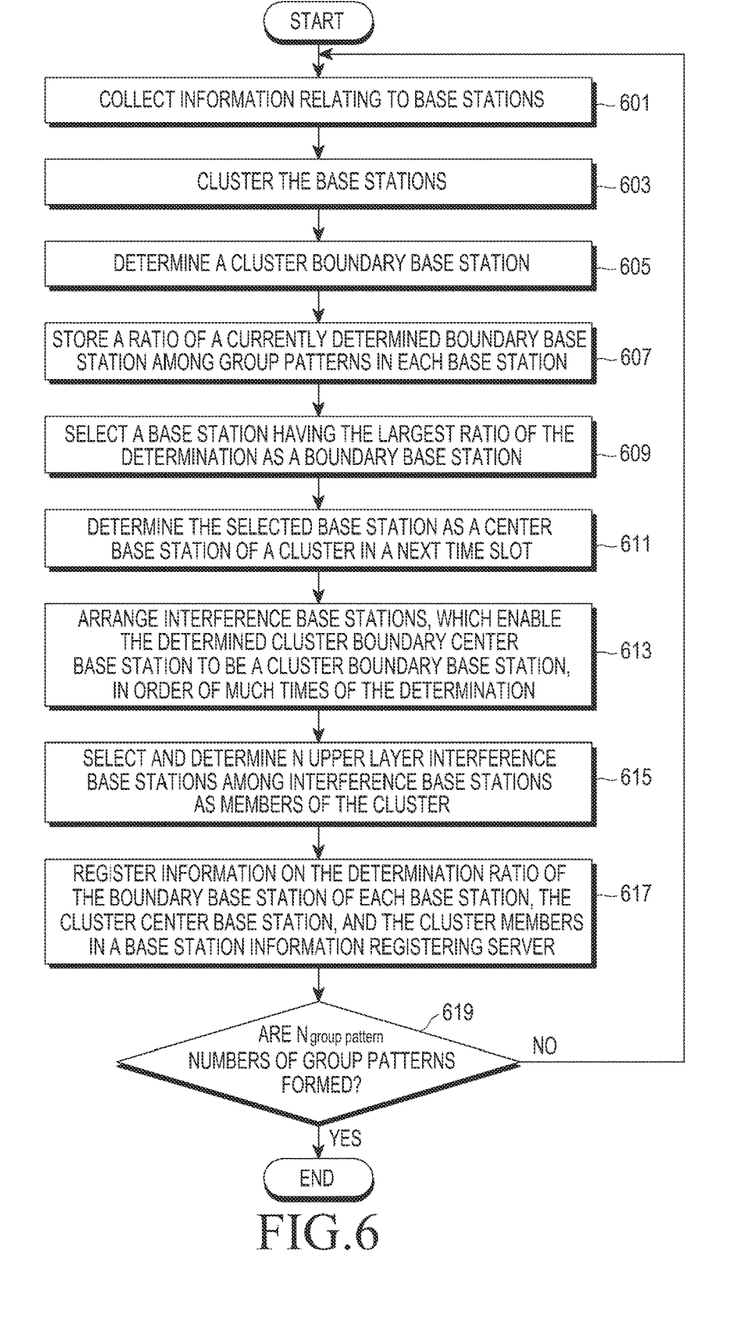
FIG. 6 is a flowchart illustrating a process of controlling inter-cluster interference using a dynamic clustering method according to the first exemplary embodiment of the present invention.

FIG. 6 is a flowchart illustrating a process of controlling inter-cluster interference using a dynamic clustering method according to the first exemplary embodiment of the present invention.

Referring to FIG. 6, a reference numeral is not given to the dynamic clustering apparatus illustrated in FIG. 6 because the dynamic clustering apparatus does not perform a certain operation for one cluster, but rather an identical operation for each cluster.

In step 601, a control server collects information relating to base stations including cluster information from a base station information registering server.

In step 603, the control server clusters a plurality of base stations into at least one cluster by using the cluster information included in the collected information relating to the base stations.

In step 605, the control server determines a cluster boundary base station among the plurality of base stations included in the cluster by using a process of determining the cluster boundary base station such as, for example, using the process illustrated in FIG. 4.

In step 607, as a result of determining the cluster boundary base station, the control server stores a ratio of the cluster boundary base station among group patterns in each base station.

In step 609, the control server selects a base station having the largest determination ratio of the cluster boundary base station stored in each base station.

In step 611, the control server determines the selected base station as a center base station of the cluster in a next time slot.

In step 613, the control server arranges interference base stations, which enable the control server to determine the center base station as the cluster base station, in order of a number of times that each respective base station is determined to be the cluster base station.

In step 615, the n numbers of upper layer interference base stations among the interference base stations are selected and determined as members of a corresponding cluster.

Then, in step 617, the control server registers a boundary base station determination ratio of each base station, a center base station and cluster member information in the base station registering server.

In step 619, the control server determines whether all group patterns ($N_{group\ pattern}$) are formed in one cluster. If the control server determines that all group patterns are formed in one cluster in step 619, the control server completes its operation. Otherwise, if the control server determines that all group patterns are not formed in one cluster in step 619, the control server returns to step 601 in order to form next group patterns.

Figure 7:
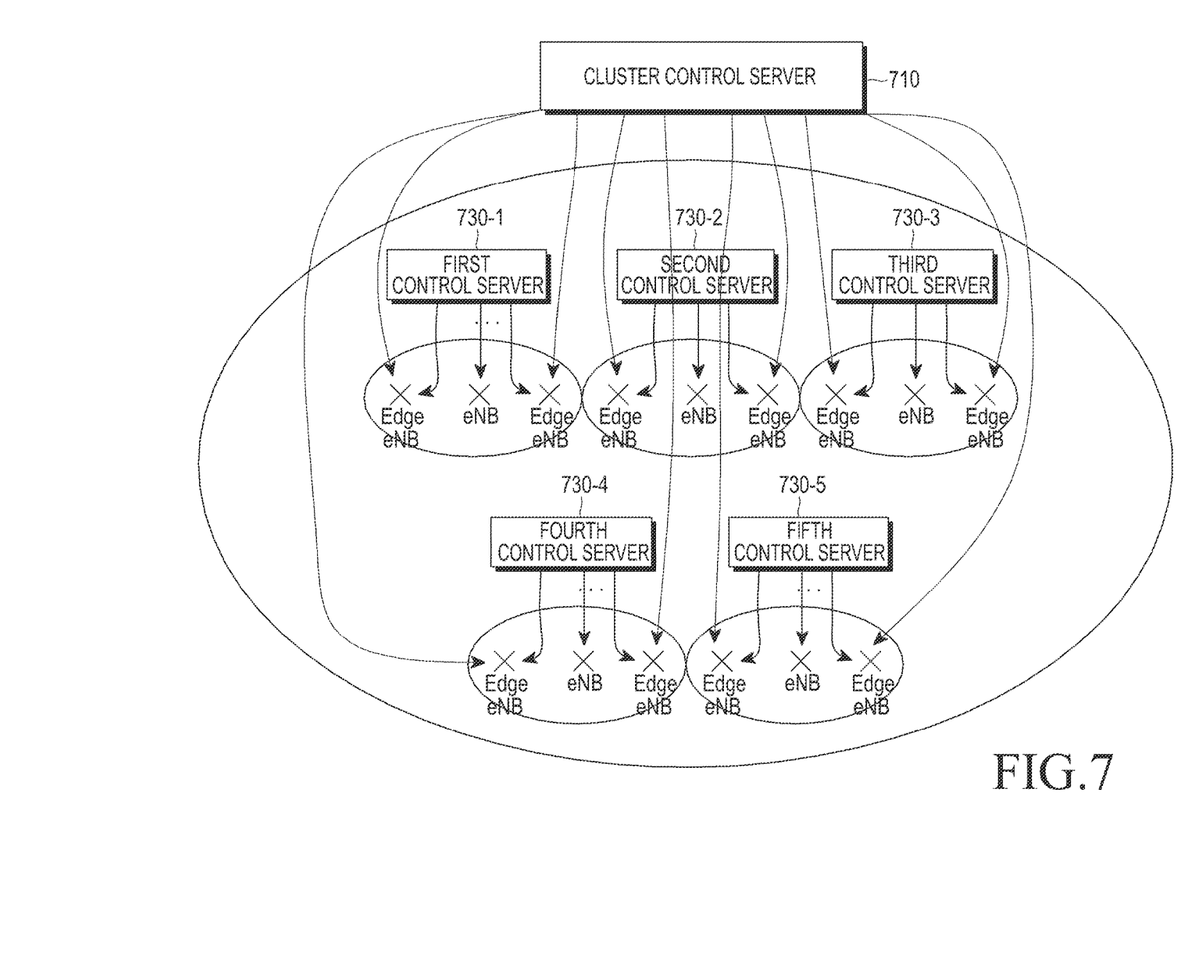
FIG. 7 is a view illustrating an example of controlling inter-cluster interference using a hierarchical clustering method according to the second exemplary embodiment of the present invention.

FIG. 7 is a view illustrating an example of controlling inter-cluster interference using a hierarchical clustering method according to the second exemplary embodiment of the present invention.

Referring to FIG. 7, the hierarchical clustering method induces an upper layer cluster concept for managing a cluster in order to effectively control an interference between cluster boundary base stations. For example, a cluster control server 710 manages a mutual control process of controlling interference among cluster boundary base stations by using scheduling information of cluster boundary base stations determined by a first control server to a fifth control server 730-1 to 730-5.

Figure 8:
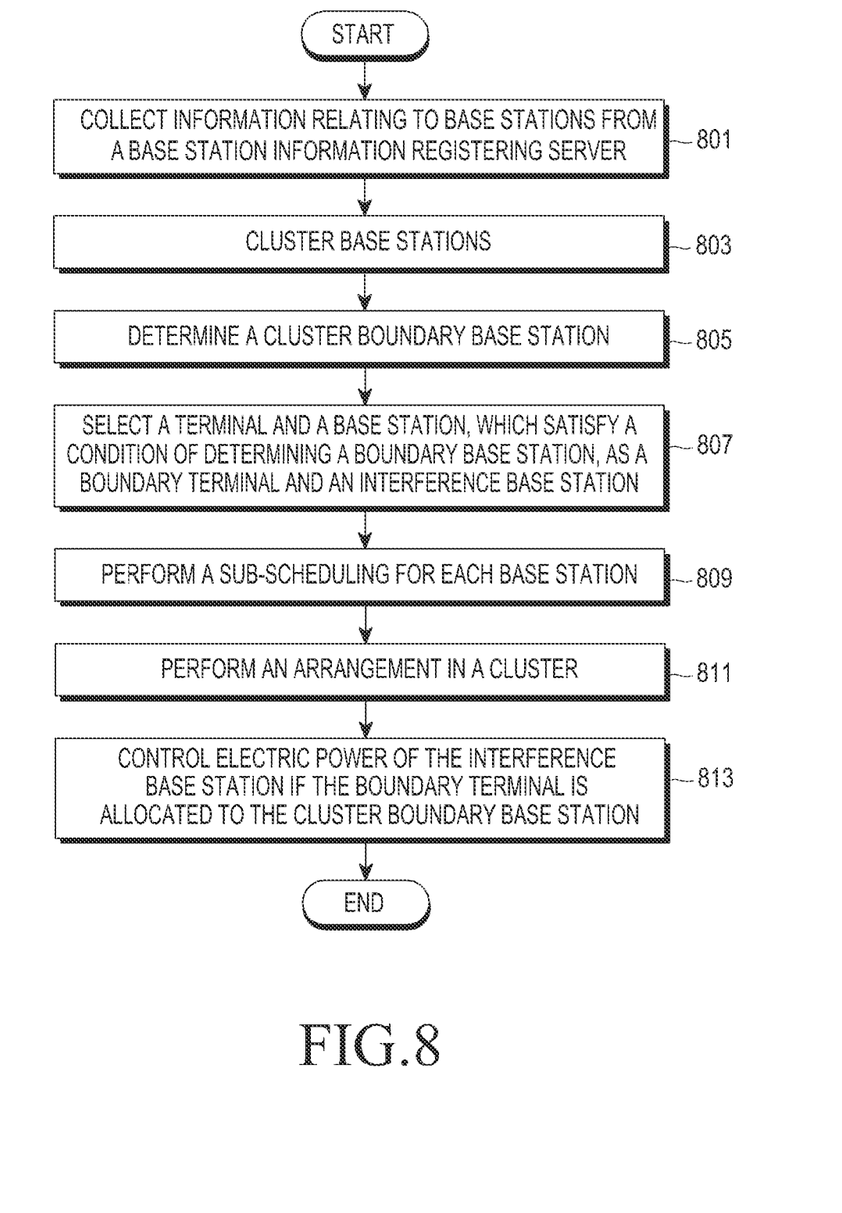
FIG. 8 is a view illustrating a process of controlling inter-cluster interference using a hierarchical clustering method according to the second exemplary embodiment of the present invention.

FIG. 8 is a view illustrating a process of controlling inter-cluster interference using a hierarchical clustering method according to the second exemplary embodiment of the present invention.

Referring to FIG. 8, a reference numeral is not given to the dynamic clustering apparatus illustrated FIG. 8 because the dynamic clustering apparatus does not perform a certain operation for one cluster, but rather an identical operation for each cluster.

In step 801, a control server collects information relating to base stations including cluster information from a base station information registering server.

In step 803, the control server clusters a plurality of base stations into at least one cluster by using the cluster information included in the collected information relating to the base stations.

In step 805, the control server determines a cluster boundary base station among the plurality of base stations included in the cluster by using a process of determining the cluster boundary base station such as, for example, using the process illustrated in FIG. 4.

In step 807, the control server selects a boundary edge terminal, which is determined as a cluster boundary base station, and an interference base station.

In step 809, the control server performs a sub-scheduling of each base station, and in step 811, the control server performs a coordination in the cluster. In step 809, the control server schedules which terminal is allocated in a current time slot.

In step 811, where another base station interferes with a terminal allocated to the base station in the cluster, the control server controls the interference.

In step 813, the cluster control server controls electric power of the interference base station for the boundary edge terminal, when the boundary edge terminal is allocated to the cluster boundary base station.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of controlling inter-cluster interference in a multi cell network, the method comprising:
   collecting cluster information;
   clustering base stations into a cluster by using at least one of a dynamic clustering method and a hierarchical clustering method, based on the cluster information;
   determining a serving base station among base stations in the cluster as a cluster boundary base station based on a determination that at least one terminal, which communicates with the serving base station, satisfies a conditional expression, wherein the conditional expression is determined by using a ratio of a downlink received signal strength for the serving base station in the cluster to downlink received signal strengths for base stations in at least one neighboring cluster; and
   controlling the inter-cluster interference using the determined cluster boundary base station.

2. The method as claimed in claim 1, wherein the determining of the cluster boundary base station comprises:
   collecting downlink received signal strength indication (RSSI) information from the at least one terminal; and
   selecting downlink RSSI information of the base stations in the at least one neighboring cluster, from the collected downlink RSSI information,
   wherein the collected downlink RSSI information is related to the downlink received signal strength for the serving base station in the cluster, and
   wherein the selected downlink RSSI information is related to the downlink received signal strengths of the base stations in the at least one neighboring cluster.

3. The method as claimed in claim 2, wherein the controlling of the inter-cluster interference comprises:
   storing a ratio of a determination of the cluster boundary base station in each of the base stations;
   selecting a base station having the largest ratio among the base stations;
   determining the selected base station as a center base station of the cluster in a next time slot;
   arranging base stations, which enable the determined center base station of the cluster to be determined as the cluster boundary base station, in order of a number of times that each respective base station is determined to be the cluster base station;
   selecting and determining N numbers of upper layer base stations among the arranged base stations, as members of the cluster; and
   registering information on the ratio, the determined cluster center base station and the determined cluster member, as cluster information of the next time slot,
   wherein the N is a predetermined natural number.

4. The method as claimed in claim 2,
   wherein the conditional expression for the determination of the cluster boundary base station is expressed by:

$$\frac{RSSI_i}{RSSI_{serving}} > \alpha,$$

and
   wherein $RSSI_i$ is a selected RSSI, $RSSI_{serving}$ is an RSSI of the serving base station, and $\alpha$ is a critical value used for determining the cluster boundary base station.

5. The method as claimed in claim 2, wherein the controlling of the inter-cluster interference comprises:
   selecting a terminal and an interference base station which satisfy the conditional expression for the determination of the cluster boundary base station; and
   controlling electric power of the selected interference base station if the selected terminal is allocated to the determined cluster boundary base station.

6. An apparatus for controlling inter-cluster interference in a multi cell network, the apparatus comprising:
   at least one processor configured to:
   collect clustering information,
   cluster base stations into a cluster by using at least one of a dynamic clustering method and a hierarchical clustering method, based on the clustering information,
   determine a serving base station among base stations in the cluster as a cluster boundary base station, based on a determination that at least one terminal, which communicates with the serving base station, satisfies a conditional expression, wherein the conditional expression is determined by using a ratio of a downlink received signal strength for the serving base station in the cluster to downlink received signal strengths for base stations in at least one neighboring cluster, and
   control the inter-cluster interference using the determined cluster boundary base station.

7. The apparatus as claimed in claim 6, wherein the at least one processor is further configured to:
   collect downlink received signal strength indication (RSSI) information from the at least one terminal, and
   select downlink RSSI information of base stations in the at least one neighboring cluster, from the collected downlink RSSI information,
   wherein the collected downlink RSSI information is related to the downlink received signal strength for the serving base station in the cluster, and
   wherein the selected downlink RSSI information is related to the downlink received signal strengths of the base stations in the at least one neighboring cluster.

8. The apparatus as claimed in claim 7, wherein the at least one processor is further configured to:
   store a ratio of a determination of the cluster boundary base station in each of the base stations,
   select a base station having the largest ratio among the base stations,
   determine the selected base station as a center base station of the cluster in a next time slot, arrange base stations, which enable the determined center base station of the cluster to be determined as the cluster boundary base station, in order of a number of times that each respective base station is determined to be the cluster base station, select and determine N numbers of upper layer base stations among the arranged base stations, as members of the cluster, and register information on the ratio, the determined cluster center base station and the determined cluster member, as cluster information of the next time slot, wherein N is a predetermined natural number.

9. The apparatus as claimed in claim 7, wherein the conditional expression for the determination of the cluster boundary base station is expressed by:

$$\frac{RSSI_i}{RSSI_{serving}} > \alpha,$$

and wherein $RSSI_i$ is a selected RSSI, $RSSI_{serving}$ is an RSSI of the serving base station, and $\alpha$ is a critical value used for determining the cluster boundary base station.

10. The apparatus as claimed in claim 7, wherein the at least one processor is further configured to:

select a terminal and an interference base station which satisfy the conditional expression for the determination of the cluster boundary base station, and control electric power of the selected interference base station if the selected terminal is allocated to the determined cluster boundary base station.

11. A non-transitory computer-readable storage medium configured to store instructions that when executed perform the method of claim 1.

* * * * *